UNITED STATES PATENT OFFICE.

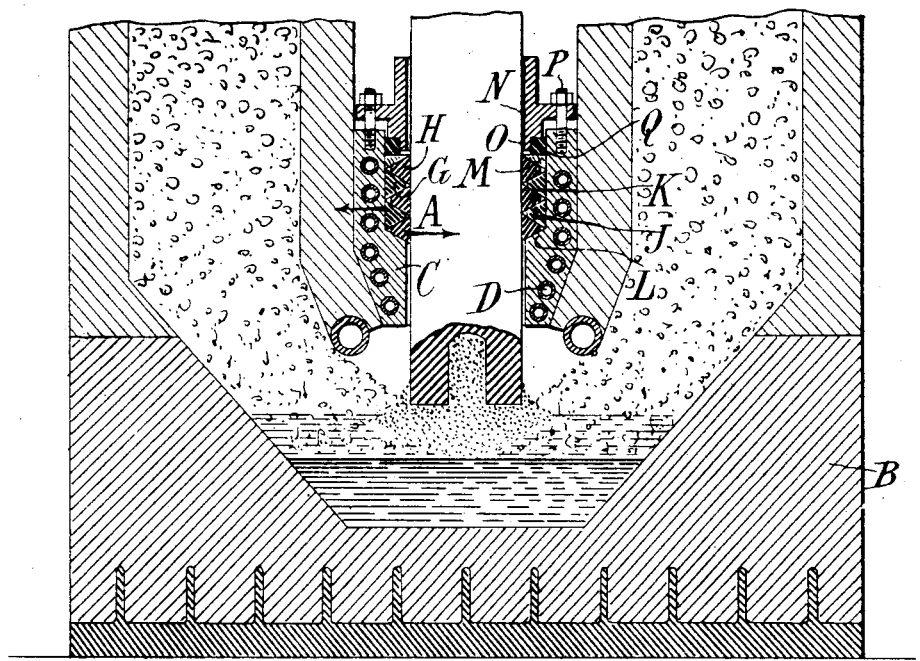
FIG. 1.
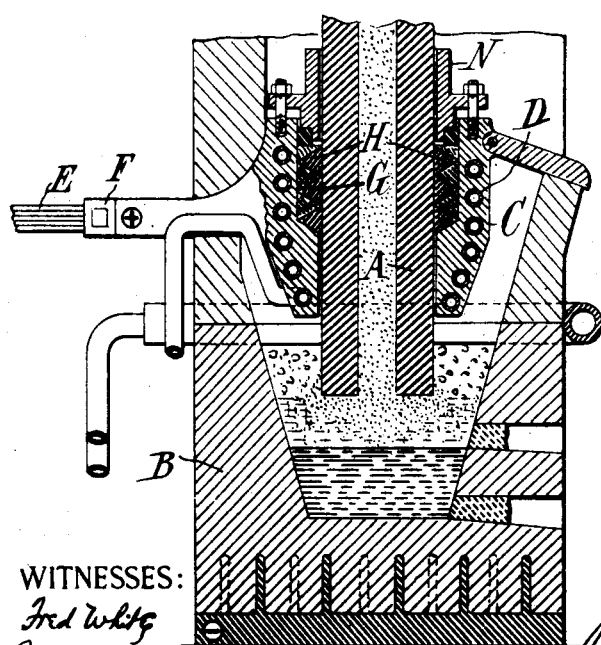
FIG. 2.
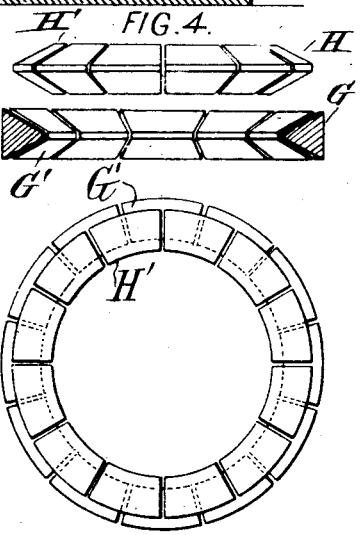
FIG. 4.
FIG. 3.

PAUL LOUIS TOUSSAINT HÉROULT, OF LA PRAZ, FRANCE, ASSIGNOR TO SOCIETE ELECTRO-METALLURGIQUE FRANCAISE, OF FROGES, FRANCE.

ELECTRIC FURNACE.

No. 871,338.　　　　Specification of Letters Patent.　　　　Patented Nov. 19, 1907.

Application filed April 21, 1906. Serial No. 313,022.

To all whom it may concern:

Be it known that I, PAUL LOUIS TOUSSAINT HÉROULT, a citizen of the Republic of France, residing at La Praz, Savoie, France, have invented certain new and useful Improvements in Electric Furnaces, of which the following is a specification.

The invention aims to provide an improved stuffing box and contact for the electrode of an electric furnace, such for example as is described in the application of Messrs. Haanel, Sejournet and myself, for patent in Canada, filed December 14, 1905, the essential characteristic of which is the extension of the end of the electrode into a closed chamber into which the charge of ore or the like is fed from the side, so that only the end of the electrode is exposed, and the portion above is insulated and thus protected. The invention, however, may be used in whole or in part in other situations.

Various advantages are referred to in detail hereinafter.

The accompanying drawings illustrate an embodiment of the invention.

Figure 1 is a vertical sectional view; Fig. 2 is a vertical section at right angles to Fig. 1; Fig. 3 is a plan of a pair of the divided contact rings. Fig. 4 is a detail showing a pair of packing rings.

Referring to the embodiment of the invention illustrated, the electrode A extends downward into the body of the furnace B, the electrode being hollow so that the carbon for reducing the charge may be fed therethrough. The opening through which the electrode passes is closed by a tubular member or stuffing box C, preferably of copper, so as to radiate heat rapidly, and which may be cooled by water or air passed through a coil D cast into the stuffing box. This stuffing box is supported in any suitable fashion, as by being built into the surrounding material of the furnace. At the same time it serves as a conductor of the current through the cables E to the electrode, the usual cable box F being bolted to a projection on the stuffing box.

The electrode slides downward through the stuffing box as its lower end is consumed, and it is important to maintain a good contact between the stuffing box and the electrode. For this purpose I propose to employ divided rings of conducting material surrounding the electrode, the adjacent rings having contacting faces which are wedge-shaped, so that the pressing of them together not only makes a more intimate contact between them, but also makes a more intimate contact of one of the rings with the electrode. The wedge-shaped faces are in contact with each other throughout substantially their entire extent, so as to provide a large area for the passage of the current. For example as shown, the successive rings G H may each be made up of a series of blocks G' H' (Fig. 3) with radial edges so as to permit their separation or coming together to fit in variations in the electrode. The upper faces J of the blocks G' are conical, and the lower faces K of the blocks H' are also conical and fitting the faces J throughout substantially their entire extent. Any desired number of rings G H may be repeated one above another to suit the quantity of current or other conditions.

The box C is provided with a beveled face L upon its lower wall, so as to insure the proper action of the lowest ring G. The rings G and H are preferably of graphite or other form of carbon. At the upper end of the box is a ring M, preferably of copper, having a lower conical face corresponding to the lower faces of the successive carbon rings. Means are provided for exerting a downward pressure on the ring M, such means consisting for example of a gland N, which may also be of copper, and which has a flange O which is drawn into the stuffing box by means of bolts P. Preferably a ring Q, of rubber or other yielding material, is interposed between the gland and the copper ring M. The flange O of the gland lies between the electrode and the packing ring Q to protect it from the heat of the electrode.

The carbon blocks of successive rings break joints with each other, as shown in Fig. 3. When they are squeezed together by turning the bolts P, not only are their conical faces brought together with a greater pressure, but also they press with greater effect inward against the electrode and outward against the wall of the stuffing box, as indicated by the arrows in Fig. 1. By merely loosening the nuts of the gland, the electrode will be allowed to fall through the stuffing box to a desired extent, whereupon the nuts may be tightened and the good contact maintained.

Though I have described with great particularity of detail certain specific embodiments of my invention, yet it is not to be understood therefrom that the invention is limited to the particular embodiments disclosed. Various modifications thereof in detail and in the arrangement and combination of the parts, may be made by those skilled in the art, without departure from the invention.

What I claim is:—

1. The combination in an electric furnace, of an electrode, a stuffing box surrounding the electrode at the point where it enters the furnace, and means for making a contact with said electrode comprising divided rings of conducting material adapted to surround the electrode, the adjacent rings having contacting faces which are wedge-shape so that the pressing of the adjacent rings together makes a more intimate contact between them, and also a more intimate contact of one ring with the electrode.

2. A contact for an electrode comprising divided rings G and H made up of a series of separate blocks G' H' of carbon adapted to surround the electrode, the ring G having an upper conical face J and the ring H having a lower conical face K in engagement therewith, so that the pressing of the adjacent rings together makes a more intimate contact between them, and also a more intimate contact of one ring with the electrode.

3. The combination in an electric furnace, of an electrode, a stuffing box surrounding the electrode at the point where it enters the furnace, and means for making a contact between said furnace and said electrode comprising divided rings G and H made up of a series of carbon blocks G' and H' adapted to surround the electrode, the ring G having an upper conical face J and the ring H having a lower conical face K in engagement therewith, the inner face L of the lower wall of the stuffing box being correspondingly conical, a copper ring M above said carbon rings, a ring Q of packing material above said copper ring, and a gland N for exerting pressure upon said packing ring and thereby upon said copper and carbon rings, said gland having a flange R protecting the packing ring Q from the heat of the electrode.

In witness whereof, I have hereunto signed my name in the presence of two subscribing witnesses.

PAUL LOUIS TOUSSAINT HÉROULT.

Witnesses:
D. ANTHONY USINA.
FRED WHITE.